United States Patent
Sayeedi

(10) Patent No.: US 7,209,462 B2
(45) Date of Patent: Apr. 24, 2007

(54) APPARATUS AND METHOD FOR SUPPORTING COMMON CHANNEL PACKET DATA SERVICE IN A CDMA2000 RAN

(75) Inventor: Shahab M. Sayeedi, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 1020 days.

(21) Appl. No.: 10/095,190

(22) Filed: Mar. 11, 2002

(65) Prior Publication Data

US 2002/0145990 A1 Oct. 10, 2002

Related U.S. Application Data

(60) Provisional application No. 60/281,989, filed on Apr. 6, 2001.

(51) Int. Cl.
  *H04J 3/24* (2006.01)
  *H04B 7/216* (2006.01)
  *H04Q 7/20* (2006.01)

(52) U.S. Cl. ............... 370/335; 370/342; 370/349; 455/466

(58) Field of Classification Search ........ 370/328–335, 370/342–352, 441–466; 455/436–439, 458–466
See application file for complete search history.

(56) References Cited

U.S. PATENT DOCUMENTS

| | | | |
|---|---|---|---|
| 6,708,031 B2* | 3/2004 | Purnadi et al. ............. 455/436 |
| 6,738,617 B2* | 5/2004 | Rosen et al. ................ 455/418 |
| 6,912,214 B2* | 6/2005 | Madour et al. ............. 370/340 |
| 6,963,540 B2* | 11/2005 | Choi et al. .................. 370/252 |
| 6,978,143 B1* | 12/2005 | Vialen ...................... 455/452.2 |
| 2002/0025815 A1* | 2/2002 | Rune et al. ................. 455/436 |
| 2002/0055364 A1* | 5/2002 | Wang et al. ................ 455/466 |
| 2002/0057658 A1* | 5/2002 | Lim ........................... 370/331 |
| 2002/0071407 A1* | 6/2002 | Koo et al. .................. 370/335 |
| 2002/0097740 A1* | 7/2002 | Choi et al. .................. 370/441 |

\* cited by examiner

*Primary Examiner*—Man U. Phan

(57) ABSTRACT

An apparatus and method for supporting common channel packet data (CCPD) services in a cdma2000 random access network without using a traffic channel. A CCPD device requests CCPD service from the network by sending an Origination message to the BS with the SDB_DESIRED_ONLY bit set to 1 and the FCH_SUPPORTED bit and DCCH_SUPPORTED bit set to 0. Upon successful authentication of the device, PPP connection setup and Mobile IP Registration are performed using SDBs over common channels to exchange messages. The first SDB sent to the CCPD device by the BS acknowledges the device's request for CCPD service. If the BS is unable to support the CCPD service request, no SDB will be sent and the call attempt will fail. A CCPD MS may request CCPD service from the network by sending an Origination message to the BS with the SDB_DESIRED_ONLY bit, FCH_SUPPORTED bit and DCCH_SUPPORTED bit set to 1. If the BS denies the request for CCPD services, normal packet data procedures are performed.

37 Claims, 9 Drawing Sheets

APPARATUS AND METHOD FOR SUPPORTING COMMON CHANNEL PACKET DATA SERVICE IN A CDMA2000 RAN

REFERENCE(S) TO RELATED APPLICATION(S)

The present application claims priority from provisional application, Ser. No. 60/281,989, entitled "APPARATUS AND METHOD FOR SUPPORTING COMMON CHANNEL PACKET DATA SERVICE IN A CDMA2000 RAN," filed Apr. 6, 2001, which is commonly owned and incorporated herein by reference in its entirety.

FIELD OF THE INVENTION

The invention relates to the field of communication systems, and more particularly, to a Code Division Multiple Access (CDMA) communications system.

BACKGROUND OF THE INVENTION

Data services are generally grouped into two categories: circuit-oriented (which includes Asynchronous Data and Group-3 Fax services) and packet. For calls that support packet data services, a Packet Data Serving Node (PDSN) serves as an interface between the transmission of data in a fixed network and the transmission of data over an air interface. The PDSN interfaces to a base system (BS) through a Packet Control Function (PCF), which may or may not be co-located with the BS.

As defined in the $3^{rd}$ Generation Partnership Project 2; 3GPP2 Access Network Interfaces Interoperability Specification (hereinafter referred to as 3GPP2 A.S0001-A), which is herein incorporated by reference, there are three packet data service states: Active/Connected, Dormant, and Null/Inactive. (The 3GPP2 specification is the same in content as TIA/EIA/IS-2001-A June 2001.) When a MS station (MS) originates a packet data call to the current cdma2000 Radio Access Network (RAN), a traffic channel is allocated to establish a point-to-point protocol (PPP) connection and perform Mobile Internet protocol (IP) Registration procedures. Upon successful completion of these procedures, the MS's packet data service transitions from a Null to an Active/Connected state and the network and MS exchange packet data over a traffic channel. After a predefined period of inactivity, the MS's packet data service transitions from an Active to a Dormant state, however it may become Active again if the MS or network has data to send. Inter-PDSN Dormant mode handoffs also require the allocation of a traffic channel to support the setup of a new PPP connection and Re-Registration.

In the Active/Connected State, a physical traffic channel exists between a MS and a BS, and either unit may send data. In the Dormant State, no physical traffic channel exists between the MS and BS, but the PPP link between the MS and the PDSN is maintained. In the Null/Inactive State, there is no traffic channel between the MS and BS and there is no PPP link between the MS and the PDSN.

A1 through A11 interfaces are defined in Section 1.7.2 of 3GPP2 A.S0001-A. A1 and A8 connections are maintained during the Active/Connected state and released during transition to Dormant or Null/Inactive state. The A10 connection is maintained during the Active/Connected and the Dormant State. As part of the support for the Dormant State, the cdma2000 air interface (TIA/EIA-IS-2000) supports a Data Ready to Send (DRS) indicator that is used on Origination.

When a MS sends an origination request with a packet data service option specified, the request includes the DRS bit. This indicator is set to 1 on initial call setup when the MS wishes to transition from Dormant to Active because it has data to send and is requesting the establishment of a traffic channel. Subsequently, the DRS bit is set to 0 to indicate that the MS has transitioned a packet zone boundary (see section 2.14.1 of 3GPP2 A.S0001-A) while Dormant, and is sending the origination request to update the network as to its current location.

Upon receipt of an origination request with the DRS bit set to 1, the BS initiates the call setup procedure as shown in Section 2.14.7.1 of 3GPP2 A.S0001-A, which normally results in the establishment of a traffic channel and in the A8 and A10 bearer connections being established. The procedures for the A8 and A10 bearer connections are defined in 3GPP2 A.S0001 -A, Sections 2.14 and 2.15, respectively. When the BS receives an origination with the DRS bit set to 0, the BS delays the establishment of a traffic channel until after the A8 and A10 bearer connection establishment procedures are complete. During the A8 bearer connection establishment procedure, the BS indicates to the PCF that a DRS=0 has been received through the use of the Data Ready Indicator element in the A9-Setup-A8 message (as defined in Section 2.14.4.1.1. of 3GPP2 A.S0001-A). If the PCF has data from the network to deliver to the MS, it indicates this by setting the cause element in the A9-Connect-A8 message (as defined in Section 2.14.4.1.2 of 3GPP2 A.S0001-A) to the Data Ready to Send value. The BS then establishes a traffic channel to the MS and completes a normal call setup procedure as specified in Section 2.14.7.10 of 3GPP2 A.S0001-A. If the PCF does not have data, it indicates that the A8 connection is not being established by sending the A9-Release-A8 Complete message (as defined in Section 2.14.5.4 of 3GPP2 A.S0001-A) to the BS. The BS then returns an Assignment Failure message to the MSC with the cause value set to Packet Call Going Dormant. Upon receipt of the Assignment Failure message, the MSC returns a Clear Command to the BS with the cause value set to Do Not Notify Mobile. The BS sends a Clear Complete message to the MSC upon receipt of the Clear Command message.

DESCRIPTION OF THE PREFERRED EMBODIMENTS

The present invention proposes an apparatus and method for supporting common channel packet data (CCPD) services in a cdma2000 RAN without the use of a traffic channel. Packet data sessions may be initiated, Dormant mode handoffs performed, and packet data may be exchanged all without the use of traffic channels. Furthermore, an A8 connection between the PCF and PDSN is not required to support packet data service once the MS has successfully registered in the network. This invention may also be applied to current cdma2000 MSs to support Dormant mode handoffs and data transmission without the use of a traffic channel. The CCPD feature supports packet data call setup, Dormant mode handoff and data transmission using short data bursts (SDBs) over common channels.

The CCPD feature is required to support a CCPD device. A CCPD device is a data-only device that does not support cdma2000traffic channels. Any signaling or data to be exchanged between a CCPD device and the network must occur over cdma2000 common channels. Although the invention may be embodied in numerous types of CCPD devices, the invention is particularly suited for use in a MS. Thus, the preferred embodiment of the invention will be described with reference to a MS.

A CCPD capable MS is a cdma2000 MS that supports CCPD services in addition to the current cdma2000 packet data services. A CCPD capable MS may request CCPD services from the network when the amount of data to be transmitted is expected to be small and infrequent or for Dormant mode handoffs. Since CCPD devices communicate over common channels rather than expensive traffic channels, these devices are relatively inexpensive to create both for the user and the network operator. Furthermore, due to their limited functionality, they are expected to be less expensive than currently available cdma2000 MSs. Potential applications for CCPD devices include: (1) telemetry—CCPD devices may be deployed at utility meters (water, electric gas); (2) vending machines—CCPD devices may be used to alert suppliers of low inventory; (3) auto/home security—CCPD devices may be used to alert authorities of a break in; (4) taxi meters; and (5) stock quotes. For simplicity of explanation, a MS that supports only CCPD services (does not support cdma2000 traffic channels) and a MS capable of supporting CCPD services and cdma2000 traffic channels is collectively referred to herein as a CCPD MS.

Figure 1:
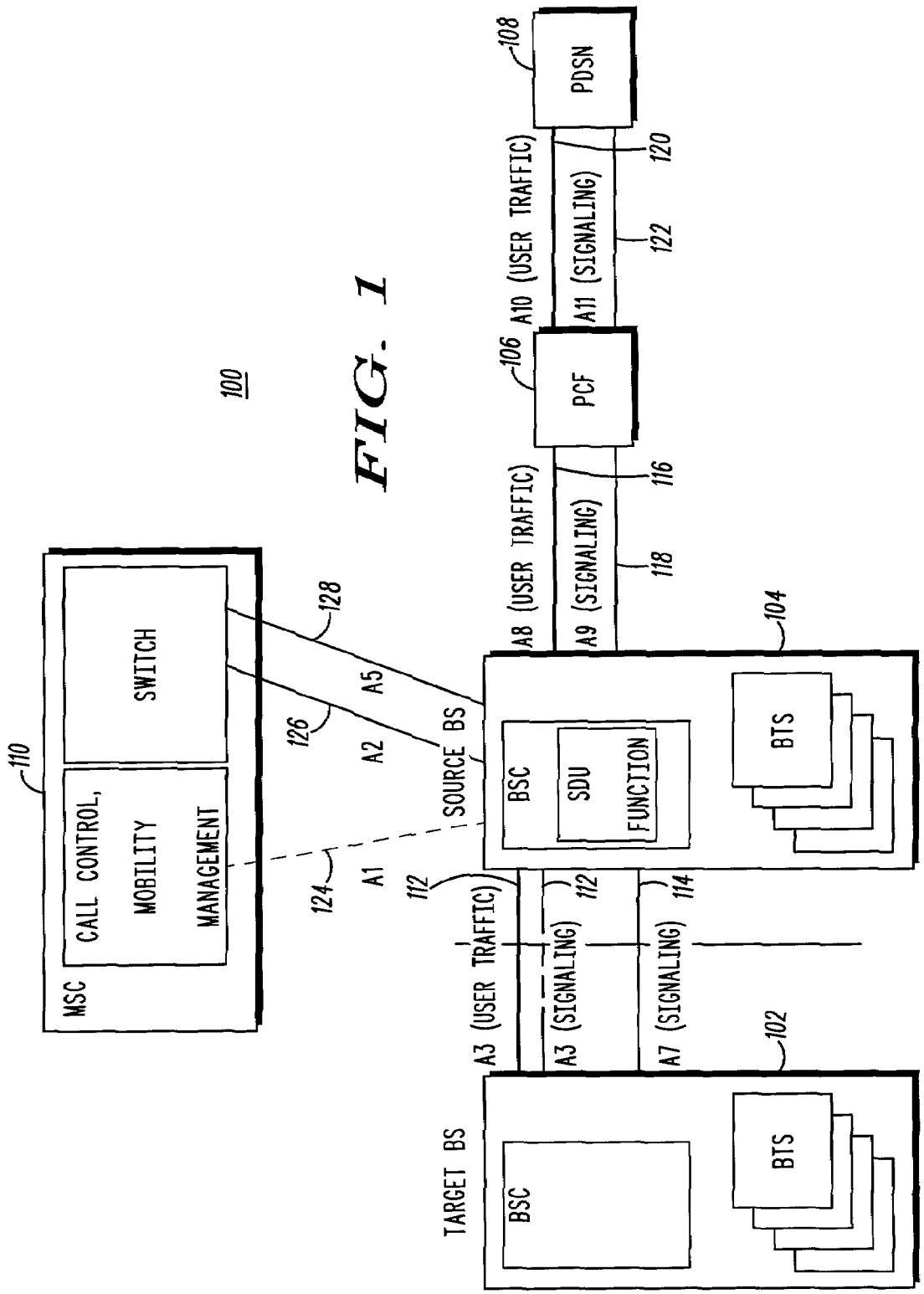
FIG. 1 is a block diagram showing the relationship among network components in support of the apparatus and method for supporting CCPD service of the present invention.

FIG. 1 is a block diagram showing the relationship among network components in support of the apparatus and method for supporting CCPD service of the present invention. As shown, a target BS 102 is coupled to a source BS 104 through an A3 interface 112 and an A7 interface 114 for the exchange of traffic and signaling information. The A3 and A7 interfaces 112, 114, respectively, are not particularly relevant to the present invention and are not further described herein. The source BS 104 is coupled to a PCF 106 through an A8 interface 116 and an A9 interface 118. The A8 interface 116 is used to provide a path for user traffic between the base station controller (BSC) in the source BS 104 and the PCF 106 for packet data services. The A9 interface 118 is used to provide a signaling connection between the source BSC and the PCF 106 for packet data services. The PCF 106 is coupled to a PDSN 108 through an A10 interface 120 and an A11 interface 122. The A10 interface 120 is used to provide a path for user traffic between the PCF 106 and the PDSN 108 for packet data services. The A11 interface 122 is used to provide a signaling connection between the PCF 106 and the PDSN 108 for packet data services. The MSC 110 is coupled to the source BS 104 through an A1 interface 124, an A2 interface 126 and an A5 interface 128. The A1, A2 and A5 interfaces 124, 126, 128, respectively, are not particularly relevant to the present invention and are not further described herein.

Messages and data between the network and a CCPD MS are exchanged over common channels encapsulated in SDBs. This includes PPP Connection, MIP Registration, and Packet data. A BS may initiate CCPD service for a CCPD MS even though the MS may not have explicitly requested the service by setting the SDB_DESIRED_ONLY bit to 1 in the Origination message. This could be used for Dormant mode handoffs. The BS may do this by responding to the MS's Origination with a SDB over the common channel rather than assigning a traffic channel for the call. Subsequent communication between the MS and the network would occur using SDBs over common channels.

A CCPD device requests CCPD service from the network by sending an Origination message to the BS with the SDB_DESIRED_ONLY bit set to 1 and the FCH_SUPPORTED bit and DCCH_SUPPORTED bits set to 0. Upon successful authentication of the device, a PPP connection setup and Mobile IP Registration are performed using SDBs over common channels to exchange the messages. The first SDB sent to the CCPD device by the BS serves as an acknowledgement to the device's request for CCPD service. If the BS is unable to support the CCPD service request from the CCPD device, no SDB is sent and the call attempt fails. The CCPD device may resend the CCPD service request.

A CCPD MS may request CCPD service from the network by sending an Origination message to the BS with the SDB_DESIRED_ONLY bit, FCH_SUPPORTED bit and DCCH_SUPPORTED bit set to 1. If the BS agrees to support a MS's request for CCPD Service, the MS is first authenticated. Upon successful authentication of the MS, the PCF is informed that CCPD services are being used for the call. PPP connection setup and Mobile IP Registration (if required) are performed using SDBs over common channels to exchange the messages. Messages and data between the BS and PCF are passed over the A9 signaling channel. The first SDB sent to the CCPD MS serves as an acknowledgment for the request for CCPD service. The network may also deny a CCPD MS's request for CCPD services and apply normal packet data procedures to setup the packet data call or transmit packet data. Upon the successful completion of PPP Connection and Mobile IP Registration, the CCPD MS's packet data service transitions from a Null/Inactive state to a Dormant state and the A8 connection between the BS and PCF is released.

In a first aspect of the present invention, the preferred embodiment of a process for a MS initiated CCPD call is provided. When a CCPD MS 202 initiates a packet data call and Mobile IP Registration has not been performed, a PPP connection setup and Mobile IP Registration are performed using SDBs over common channels. Once the PPP connection setup and Mobile IP Registration have been completed, packet data may be exchanged between the MS 202 and the network using SDBs over common channels. All messages specifying SDB format are as specified in chapter 12, section 2.2.10 of TIA/EIA/ IS-707-A-2; Ballot Resolution Version; June, 2000 (IS-707A-2).

Figure 2:
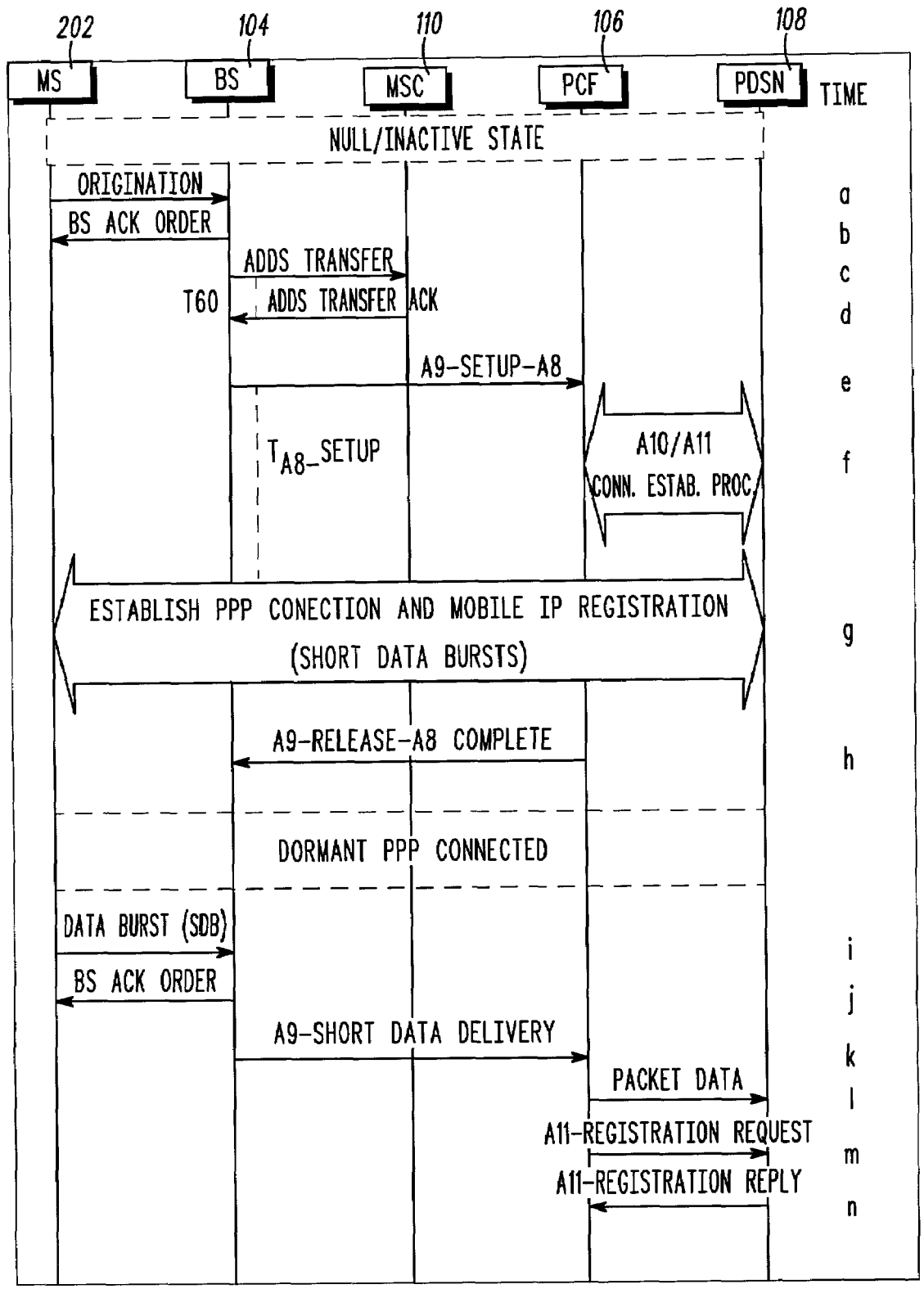
FIG. 2 is a block diagram of the preferred embodiment of a process for a MS initiated CCPD call in accordance with the present invention.

Referring to FIG. 2, at step a, the CCPD MS 202 transmits an Origination Message to the BS 104 over the access channel of the air interface with Layer 2 acknowledgment required to request packet data service. The MS 202 indicates its desire for CCPD service to the network by setting the SDB_DESIRED_ONLY bit in the message to 1. At step b, the BS 104 acknowledges receipt of the Origination Message by sending a Base Station Acknowledgment Order to the CCPD MS 202. At step c, the BS 104 sends an ADDS Transfer message (described in section 2.6.2.2 of 3GPP2 A.S0001-A) to the MSC 110. The message contains the authentication parameters received from the CCPD MS 202, the BS computed authentication data element, and the data burst type field of the ADDS User Part element set to SDB. The BS 104 starts timer T60. If the MS 202 supports traffic channels and the BS 104 decides not to support the request for CCPD services, the call is treated as a normal MS originated packet data call (as specified in section 2.14.7.1 of 3GPP2 A.S0001-A). If the BS 104 is unable to support the CCPD Service request from a CCPD device, the call fails.

At step d, the MSC 110 sends the result of authentication for the MS 202 back to the BS 104 in the ADDS Transfer Ack message (described in section 2.14.8.1.2 of 3GPP2 A.S0001-A). At step e, the BS 104 sends an A9-Setup-A8message (described in section 2.14.4.1.1 of 3GPP2 A.S001-A) to the PCF 106 to initiate PPP connection setup and mobile IP registration (if required) procedures for the CCPD MS 202. The BS 104 sets the CCPD Service bit in the message to 1 to indicate to the PCF 106 that an A8 connection is not required. If the MS 202 is a CCPD device, the BS 104 sets the CCPD bit in the message to 1 to indicate to the PCF 106 that the data session is for a CCPD device. The BS 104 then starts timer TA8-Setup. At step f, the A10/A11 connection establishment procedure is performed. At step g, upon establishment of the A10/A11 connection, the PDSN 108 and the CCPD MS 202 exchange messages over the air using SDBs over common channels to set up the PPP connection and perform MIP registration (if required). All messages exchanged between the network and MS 202 are in SDB format. The PCF 106 formats messages for the MS 202 into SDB format before sending them to the BS 104. The BS 104 sends messages from the MS 202 to the PCF 106 in SDB format. The PCF 106 converts the messages into packet data format before transmitting the data to the PDSN 108. The first SDB sent from the BS 104 to the MS 202 serves as an acknowledgment to the MS's request for CCPD service. At step h, the PCF 106 sends an A9-Release-A8 complete message (described in section 2.14.5.4 of 3GPP2 A.S0001-A) to the BS 104 with a successful cause value. The BS 104 stops timer TA8-setup. At step i, the MS 202 sends its packet data in a SDB over the common channel to the BS 104.

At step j, the BS 104 acknowledges receipt of the SDB from the MS 202 by sending a BS Ack order to the MS 202. At step k, the BS 104 sends an A9-Short Data Delivery message containing the packet data in SDB format to the PCF 106. At step I, the PCF 106 sends the data to the PDSN 108 as normal packet data. At step m, the PCF 106 sends an A-11 Registration request message (described in section 3.3 of Network Working Group; Request for Comments: 2002; C. Perkins, Editor; IBM; October 1996 and section 6.1.11.1 of 3GPP2 A.S0001-A) with the SDB Airlink record (described in section 2.15.4.4 of 3GPP2 A.S0001-A) for accounting to the PDSN 108. At step n, the PDSN 108 responds with an A11 Registration Reply message (described in section 3.4 of Network Working Group; Request for Comments: 2002; C. Perkins, Editor; IBM; October 1996 and section 6.1.11.2 of 3GPP2 A.S0001-A) to the PCF 106.

In a second aspect of the present invention, a preferred embodiment of a process for a MS terminated packet data transfer to a CCPD device with the MS 202 in a Dormant packet data state is provided. If the network has data to send to a Dormant CCPD device, the PCF 106 sends the data to the BS 104 in the A9-Short Data Delivery message. The PCF 106 is informed that the MS 202 is a CCPD device at the time the MS 202 initiates a CCPD Service Request to the network. Since the data is for a CCPD device, the PCF 106 does not need to buffer the data for the MS 202, and therefore does not require an acknowledgement from the BS 104 after the data has been sent. The BS 104 sends the data to the CCPD device in SDBs as specified in IS-707-A-2. If the BS 104 does not receive an acknowledgement from the MS 202 after sending the SDB to the MS, the BS 104 may retry sending the data and/or invoke ADDS Procedures to deliver the data. See section 2.14.8.6 of 3GPP2 A.S0001-A for the ADDS procedure.

Figure 3:
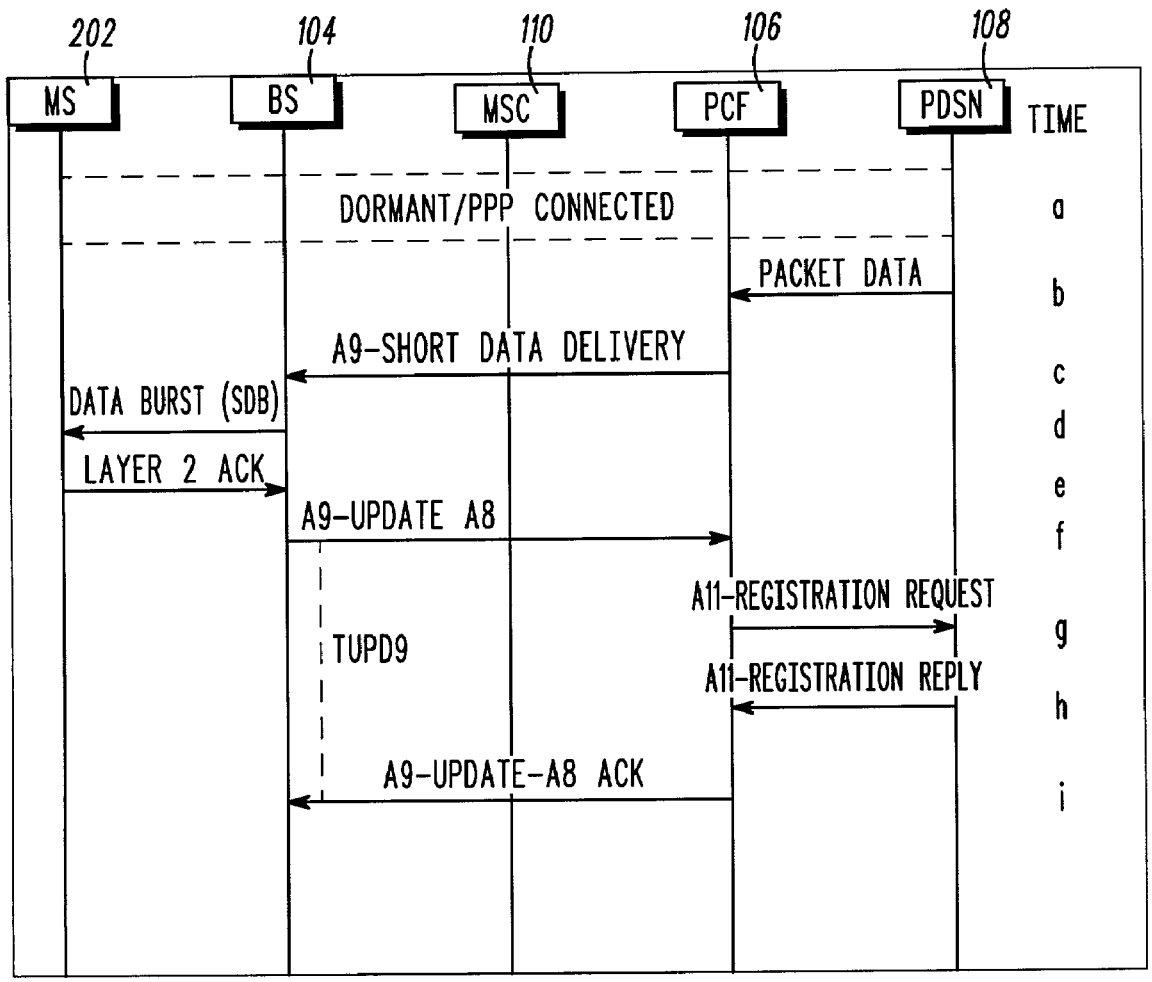
FIG. 3 is a block diagram of the preferred embodiment of a process for a MS terminated packet data transfer to a CCPD device with the MS in a Dormant packet data state in accordance with the present invention.

FIG. 3 shows the logical flow for the preferred embodiment of a process for a MS terminated packet data transfer to a CCPD device with the MS 202 in a Dormant packet data state. The PCF 106 has been informed that the MS 202 is a CCPD Device during the initial packet data session setup. All messages specifying SDB format are as specified in IS-707-A-2. At step a, PPP connection setup and Mobile IP Registration have previously been performed between the network and the MS 202. The CCPD MS 202 is currently in a Dormant packet data service state. At step b, the PDSN 108 sends packet data from the network for the CCPD MS 202. At step c, the PCF 106 sends the packet data in SDB format in the A9-Short Data Delivery message to the BS 104. At step d, the BS 104 sends the packet data to the CCPD MS 202 in a SDB over the common channel. At step e, the MS 202 acknowledges receipt of the SDB by sending a layer 2 ack to the BS 104. If a layer 2 ack is not received from the MS 202, the BS 104 may resend the SDB to the MS 202. Alternatively, the BS 104 may use the ADDS procedure to deliver the SDB to the MS 202.

At step f, the BS 104 sends an A9-Update-A8 message (described in section 2.14.5.6 of 3GPP2 A.S0001-A) to the PCF 106 to indicate the successful transmission of the SDB to the MS 202. The BS 104 starts timer Tupd9. At step g, the PCF 106 sends an A-11 Registration Request message with the SDB Airlink record for accounting to the PDSN 108. At step h, the PDSN 108 responds with an A11 Registration Reply message to the PCF 106. At step i, the PCF 106 responds to the BS 104 with an A9-Update-A8 Ack message (described in section 2.14.5.7 of 3GPP2 A.S0001-A). Upon receipt of this message, the BSC stops timer Tupd9.

Third and fourth aspects of the present invention provide Dormant handoff procedures for CCPD MSs. Upon detection of a new packet zone identifier (PZID), system identifier (SID), or network identifier (NID) a CCPD MS sends an Origination message to the BS 104 with the SDB_DESIRED_ONLY bit set to 1. The PCF establishes an A10 connection with the PDSN. If the MS continues to be served by the same PDSN, the PDSN releases the A10 connection with the previous PCF. If as a result of the Dormant mode handoff a new PDSN is selected for the call, a PPP connection is setup and Mobile IP Registration is performed using SDBs over common channels. Note, the BS 104 may refuse a CCPD MS's request for CCPD service by applying normal packet data Dormant mode handoff procedures.

The BS may also initiate CCPD service for a CCPD MS which has no data to send, even though the MS may not have explicitly requested CCPD service from the BS by setting the SDB_DESIRED_ONLY bit to 1 in the Origination message. The BS may optionally use this procedure to support Dormant mode handoffs (e.g. if a traffic channel is not available). Upon detection of a new PZID, SID, or NID, a CCPD MS sends an Origination message to the BS with the SDB_DESIRED_ONLY bit set to 0, and the DRS bit set to 0. Instead of initiating the normal Dormant mode handoff procedures, the BS authenticates the MS and informs the PCF that CCPD Service shall be used to support the Dormant mode handoff. The first SDB sent to the MS indicates that CCPD procedures shall be used to support the Dormant mode handoff. Subsequent communication between the MS and the network occurs using SDB over common channels.

Referring to the third aspect of the present invention, a process for a successful inter-PCF/intra-PDSN CCPD MS Dormant mode handoff is provided. It is assumed that the PCF is uniquely identified by the Current Access Network Identifiers (CANID). Upon detection of a new PZID, NID or SID, the CCPD MS sends an Origination Message to the target BS with the packet data service option and the SDB_DESIRED_ONLY bit set to 1. If the call is from a CCPD device, the FCH_SUPPORTED bit and DCCH_SUPPORTED bit are also set to 0. The Origination Message includes the previous PZID, NID and SID when any of these parameters change during the Dormant handoff. Based on the IDs (PZID, NID and/or SID) in the Origination Message, the target PCF sends the Previous Access Network Identifiers (PANID) of the source PCF and the CANID of the target PCF to the serving PDSN. The serving PDSN uses this information to determine if Mobile IP Registration is required. All messages specifying SDB format in the process are as specified in IS-707-A-2. This process may also be used if the network decides to use CCPD Service for the Dormant mode handoff. In such a case, the MS sends an Origination message with the SDB_DESIRED_ONLY bit set to 0. The first SDB sent to the MS indicates that CCPD procedures shall be used to support the Dormant mode handoff.

Figure 4:
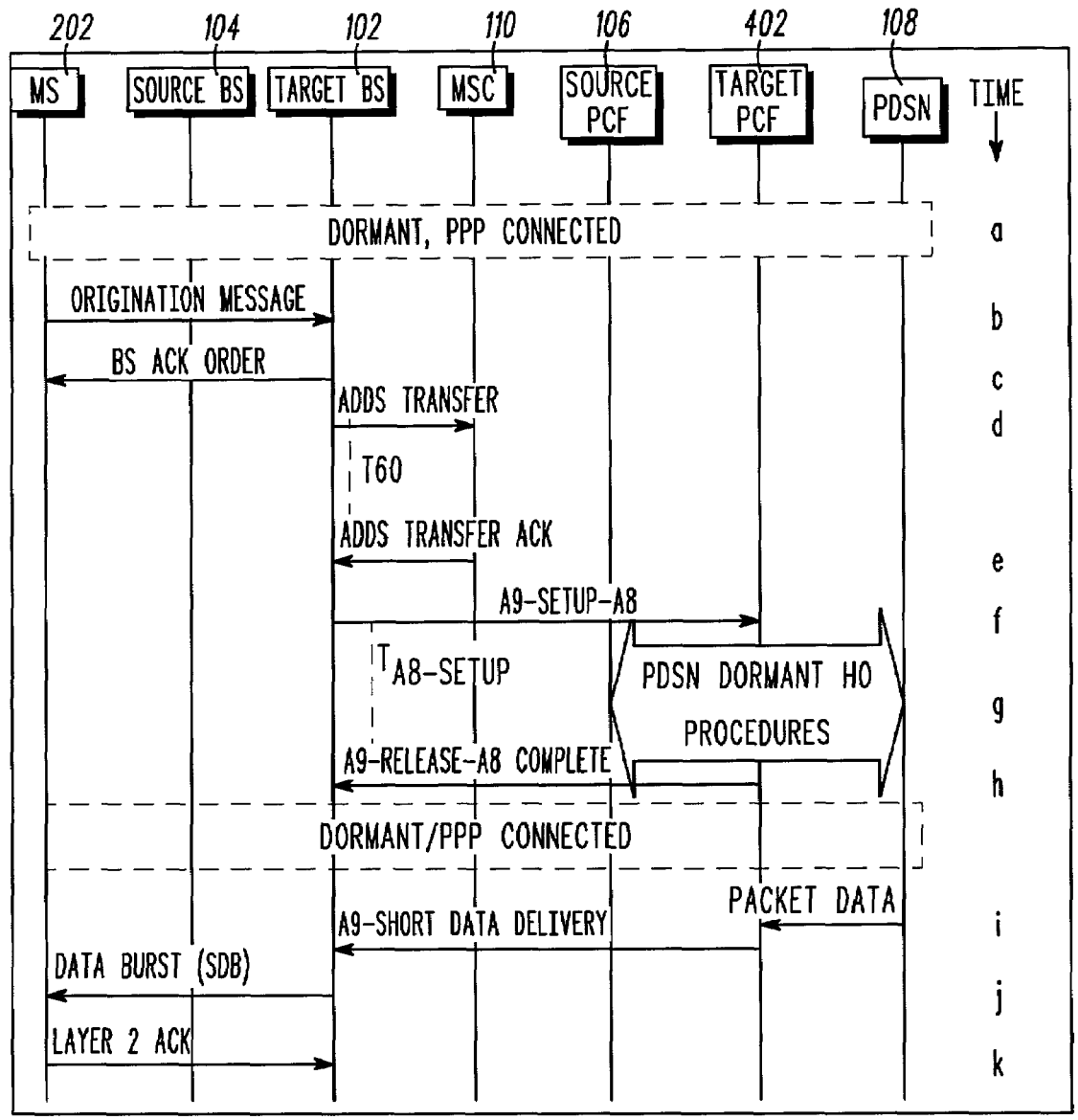
FIG. 4 is a block diagram of the preferred embodiment of a process for a successful inter-PCF/intra-PDSN CCPD MS Dormant mode handoff in accordance with the present invention.

Referring to FIG. 4, the preferred embodiment of the process for a successful inter-PCF/intra-PDSN CCPD MS Dormant mode handoff is provided. At step a, the CCPD MS 202 has previously performed PPP connection establishment and MIP Registration with the PDSN 108 and is in the Dormant state. At step b, the CCPD MS 202 detects a change of PZID, SID or NID while monitoring the broadcast channel and sends an Origination message with the SDB_DESIRED_ONLY bit set to 1. At step c, the target BS 102 acknowledges receipt of the Origination message with a Base Station Acknowledgement Order to the CCPD MS 202. At step d, the target BS 102 sends an ADDS Transfer message to the MSC 110 containing the authentication parameters received from the MS 202, the BS computed authentication data element and the data burst type field of the ADDS User Part element set to SDB. If the BS 102 determines that the CCPD MS 202 supports traffic channels, the BS 102 may alternatively execute the MS Dormant mode handoff procedure described in section 2.14.7.9 of 3GPP2 A.S0001-A. The target BS 102 starts timer T60. At step e, the MSC 110 sends the ADDS Transfer Ack message to the target BS 102 with no cause value present. The target BS 102 cancels timer T60. If authentication of the MS 202 fails, the MSC 110 includes a cause value set to 'authentication failure' in the message and the CCPD call fails.

At step f, the target BS 102 sends an A9-Setup-A8 message, with Data Ready Indicator and Handoff Indicator bits set to 0, to the target PCF 402. The BS 102 sets the CCPD Service bit in the message to 1 to indicate to the PCF 402 that an A8 connection is not required. If the MS 202 is a CCPD device, the target BS 102 sets the CCPD bit in the message to 1 to indicate to the target PCF 402 that the data session is for a CCPD MS 202. The target BS 102 starts timer TA8-setup. At step g, the target PCF 402 establishes an A10/A11 link with the PDSN 108. The PDSN 108 disconnects the A10/A11 link with the source PCF 106. If the PDSN 108 has data for the MS 202, it responds to the PCF 402 with a Registration Reply message with the Data Available Indicator in the Vendor/Organization Specific Extension (described in section 6.2.2.166 of 3GPP2 A.S0001-A).

At step h, the target PCF 402 sends an A9-Release A8 Complete message to the target BS 102 with a successful cause value. The target BS 102 cancels timer TA8-setup. At step i, if the PDSN 108 has data from the network for the CCPD MS 202, the target PCF 402 sends the data in SDB format in the A9-Short Data Delivery message to the BS 102. If the MS 202 supports traffic channels, the PCF 402 buffers the data and follows the procedure for Short Data Delivery from the PCF 402 to the MS 202 (see 2.14.8.6/7 of 3GPP2 A.S0001-A for the process). If the data is for a CCPD MS 202, the PCF 402 discards the data. At step j, if the PCF 402 sent data for the MS 202 in the A9-Short Data Delivery message to the target BS 102, the BS 102 sends the data in a SDB to the MS 202. The SDB serves as an acknowledgement for CCPD service from the BS 102. If no data was sent from the PCF 402, an empty SDB is sent to the MS 202. At step k, the CCPD MS 202 acknowledges receipt of the SDB by sending a layer 2 ack to the BS 102. If data was sent in the SDB, the A9 update procedure for Accounting (as shown in section 2.14.9.2 of 3GPP2 A.S0001-A) is performed.

Referring to the fourth aspect of the present invention, a process for a successful inter-PCF/inter-PDSN CCPD MS Dormant mode handoff is provided. When a MS in Dormant state moves into a different packet zone and ends up being Connected to a different PDSN, the target PCF is required to forward the Access Network Identifiers (ANID) of the source PCF (PANID) and the ANID of the target PCF (CANID) to the serving PDSN. PPP connection setup and Mobile IP Registration are performed using SDBs over common channels. All messages specifying SDB format in the process are as specified in IS-707-A-2. The process may also be used if the network decides to use CCPD Service for the Dormant mode handoff. In such a case, the MS sends an Origination message with SDB_DESIRED_ONLY bit set to 0. The first SDB sent to the MS indicates that CCPD procedures shall be used to support the Dormant mode handoff.

Figure 5:
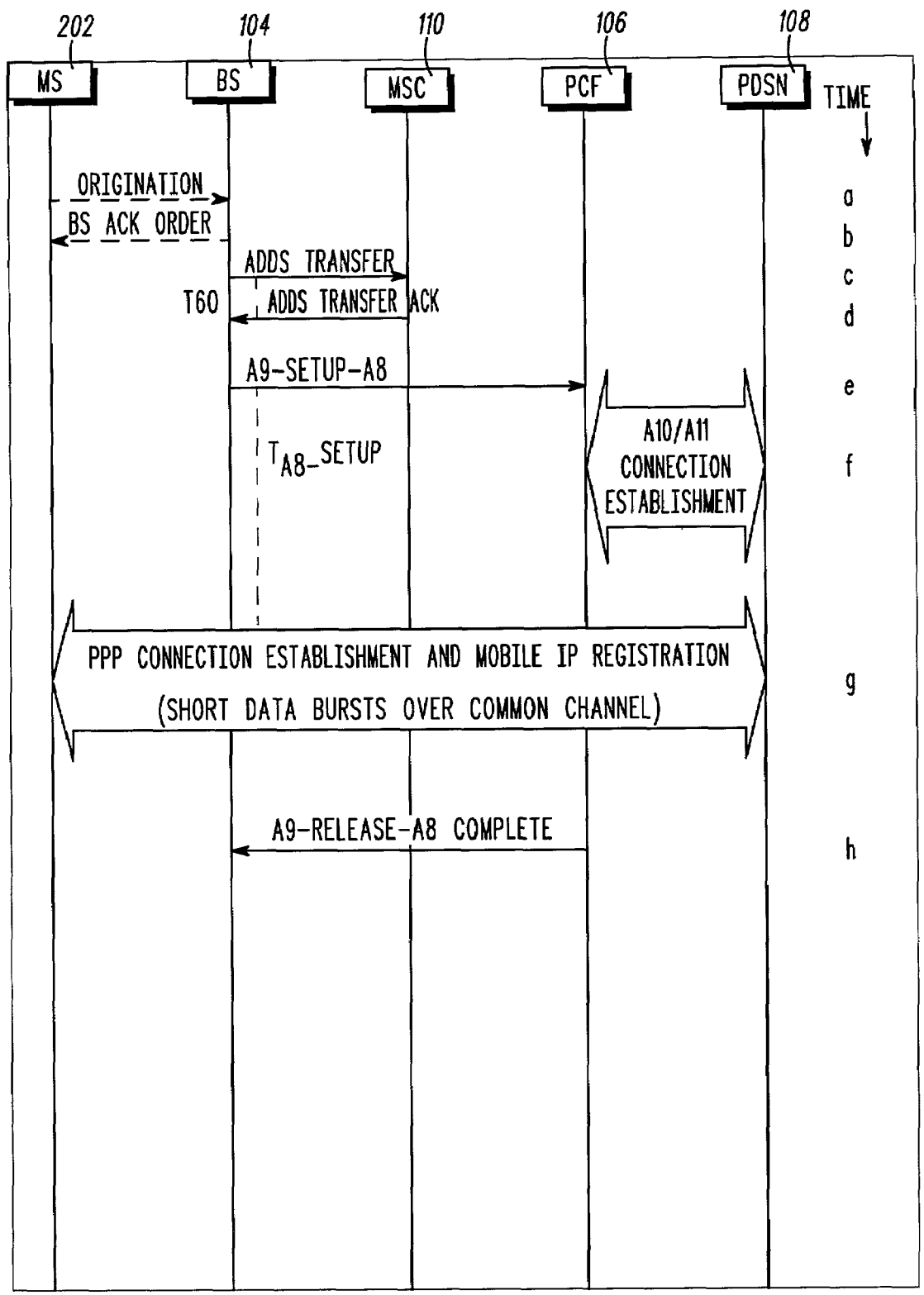
FIG. 5 is a block diagram of the preferred embodiment of a process for a successful inter-PCF/inter-PDSN CCPD MS Dormant mode handoff in accordance with the present invention.

Referring to FIG. 5, the preferred embodiment of the process for a successful inter-PCF/inter-PDSN CCPD MS Dormant mode handoff is provided. At step a, the CCPD MS 202 detects a change of PZID while monitoring the broadcast channel and sends an Origination message with the SDB_DESIRED_ONLY bit set to 1. At step b, the target BS 102 acknowledges receipt of the Origination message with a BS Ack order to the CCPD MS 202. At step c, the BS 102 sends an ADDS Transfer message to the MSC 110. The message contains the authentication parameters received from the MS 202, the BS computed authentication data element, and the data burst type field of the ADDS User Part element set to SDB. If the BS 102 determines that the CCPD MS 202 supports traffic channels, the BS 102 may alternatively execute the MS Dormant mode handoff procedure described in section 2.14.7.9 of 3GPP2 A.S0001-A. The target BS 102 starts timer T60. At step d, the MSC 110 sends the ADDS Transfer Ack message to the target BS 102 with no cause value present. The target BS 102 cancels timer T60. If authentication of the MS 202 fails, the MSC 110 includes a cause value set to 'authentication failure' in the message and the CCPD call fails.

At step e, the target BS 102 sends an A9-Setup-A8 message to the target PCF 402 with Data Ready Indicator and Handoff Indicator bits set to 0. The BS 102 sets the CCPD Service bit in the message to 1 to indicate to the PCF than an A8 connection is not required. If the MS 202 is a CCPD device, the BS 102 also sets the CCPD bit in the message to 1 to indicate to the PCF 402 that the data session is for a CCPD MS 202. The BS 102 starts timer TA8-setup. At step f, the procedure for establishing A10/A11 is performed. At step g, upon establishment of the A10/A11 connection, the PDSN 108 and the CCPD MS 202 exchange messages over the air using SDBs over common channels to set up the PPP connection and perform MIP registration. All messages exchanged between the network and MS 202 are in SDB format. The PCF 402 formats messages for the MS 202 into SDB format before sending them to the BS 102. The BS 102 sends messages from the MS 202 to the PCF 402 in SDB format. The PCF 402 converts the messages into packet data format before transmitting the data to the PDSN 108. The first SDB sent from the BS 102 to the MS 202 serves as an acknowledgment to the MS's request for CCPD service. At step h, the PCF 402 sends an A9-Release-A8 complete message to the BS 102 with a successful cause value. The BS 102 stops timer TA8-Setup. If the call is for a CCPD Capable MS 202 and the PDSN 108 has data for the MS 202, depending on the amount of data, the PCF 402 may respond to the BS 102 with cause value indicating failure, followed by a network initiated call reactivation.

Figure 6:
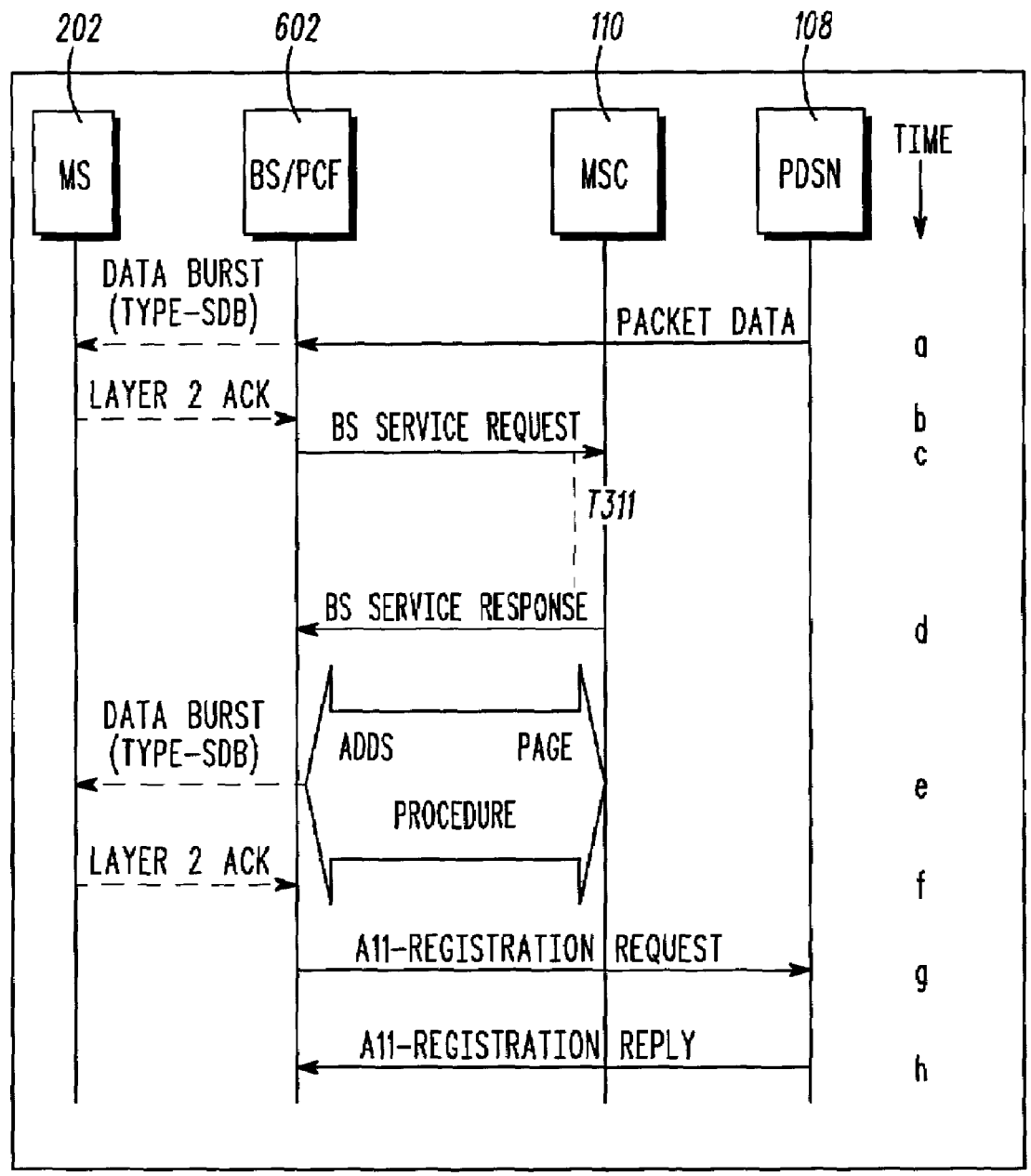
FIG. 6 is a block diagram of the preferred embodiment of a process for the receipt of packet data from a PDSN and its SDB delivery to a MS in accordance with the present invention.

A fifth aspect of the present invention provides a preferred embodiment of a process for the receipt of packet data from a PDSN and its SDB delivery to a MS. In this embodiment, the BS and the PCF as shown in FIG. 1 are configured as a single unit. Referring to FIG. 6, at step a, the PCF 602 receives packet data from the PDSN 108 and determines that this data can be delivered to the Dormant packet data service instance. The BS 602 may send a SDB directly to the MS 202. If the received data is for a CCPD device, the packet data shall always be sent to the MS 202 in a SDB. At step b, the MS 202 sends a layer 2 acknowledgement in response to the SDB from the BS 602. If a layer 2 ack is not received from the MS 202, the BS 602 may attempt to re-send the data to the MS 202. At step c, alternatively, the BS 602 may send the data in SDB format as specified in IS-707-A-2 to the MSC 110 in the BS Service Request message. The BS 602 sets timer T311. If timer T311 expires, the SDB information will not be sent to the MS 202. This step may also occur if the BS 602 fails to successfully deliver the SDB to the MS 202. At step d, the MSC 110 acknowledges the reception of the BS Service Request message by sending a BS Service Response message to the BS 602. The BS 602 cancels timer T311. At step e, the MSC 110 sends an ADDS Page message to the BS 602 with the data burst type field in the ADDS User Part element set to SDB, and the SDB in the Application Data Message field. The BS 602 forwards the SDB on to the MS 202.

At step f, the MS 202 sends a layer 2 acknowledgement after receiving the SDB from the BS 602. If the MSC 110 included a Tag element in the ADDS Page message, the BS 602 will return an ADDS Page Ack message to the MSC 110 after receiving the layer 2 ack from the MS 202. The Tag element received from the MSC 110 is included in the message. At step g, the BS/PCF 602 sends an A11-Registration Request with the SDB Airlink record to the PDSN 108. At step h, the PDSN 108 responds with the A11-Registration Reply message.

A sixth aspect of the present invention provides a preferred embodiment of a process for a MS initiated CCPD call. In this embodiment, the BS and the PCF as shown in FIG. 1 are configured as a single unit. When a CCPD MS that has not performed Mobile IP Registration initiates a packet data call, PPP connection setup and Mobile IP Registration are performed using SDBs over common channels. Once a PPP connection is setup, packet data is exchanged between the MS and the network with SDBs over common channels.

Figure 7:
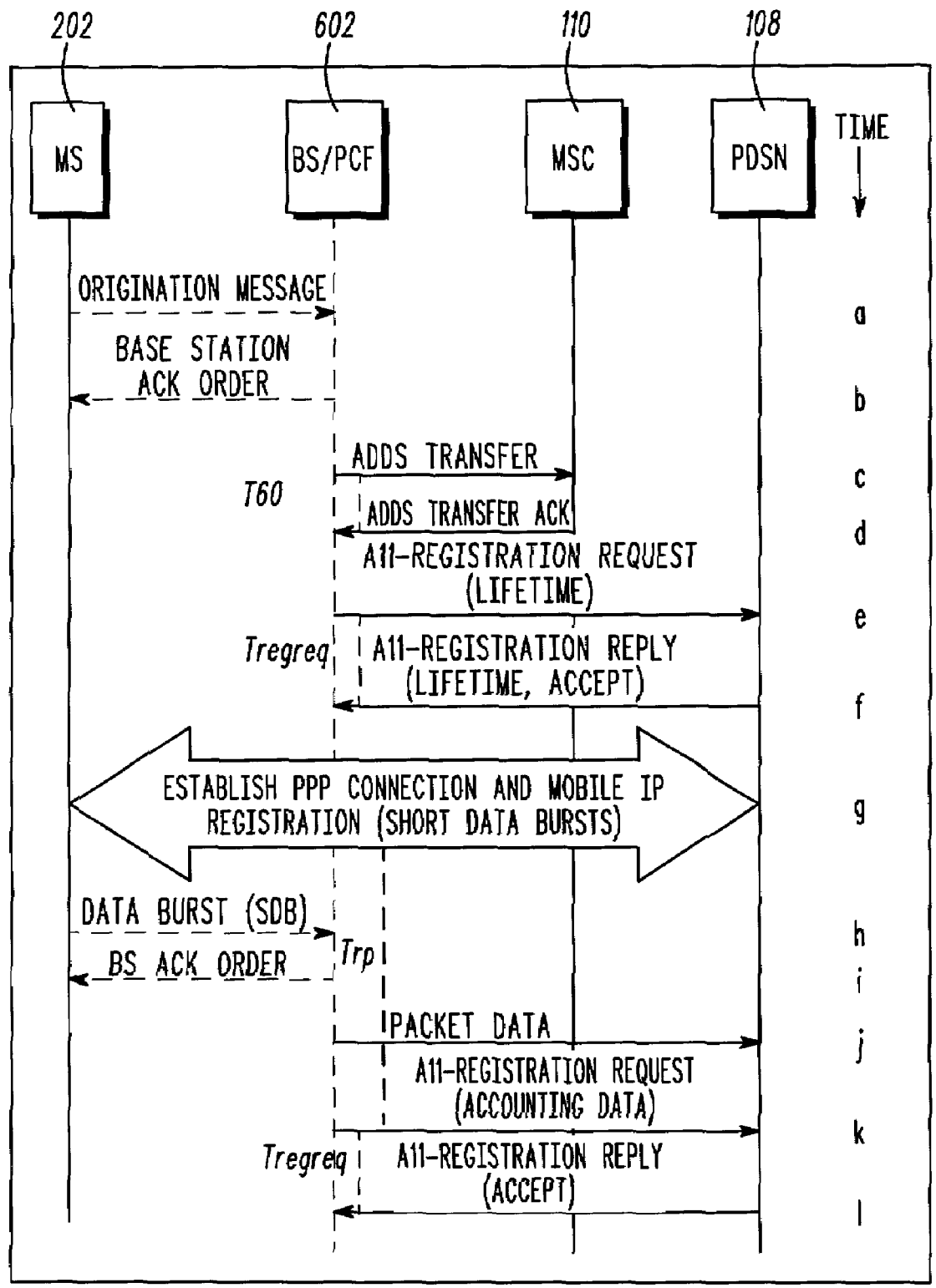
FIG. 7 is a block diagram of the preferred embodiment of a process for a MS initiated CCPD call wherein the BS and the PCF of FIG. 1 are configured as a single unit in accordance with the present invention.

Referring to FIG. 7, a flow diagram of the preferred embodiment of the process for a MS initiated CCPD call is shown. At step a, a MS 202 transmits an Origination Message to the BS 602 over the access channel of the air interface with Layer 2 acknowledgment required to request packet data service. The MS 202 indicates its desire for CCPD service to the network by setting the SDB_DESIRED_ONLY bit in the message to 1. At step b, the BS 602 acknowledges the receipt of the Origination Message with a Base Station Ack Order to the MS 202. At step c, the BS 602 sends an ADDS Transfer message to the MSC 110. The ADDS Transfer message contains the authentication parameters received from the CCPD MS 202, the BS computed authentication data element, and the data burst type field of the ADDS User Part element is set to SDB. The BS 602 starts timer T60. If the MS 202 supports traffic channels and the BS 602 decides not to support the CCPD Services request, the call is treated as a normal MS originated packet call setup (as specified in section 2.15.5.1 of 3GPP2 A.S0001-A). If the BS 602 is unable to support the CCPD service request from a CCPD device, the call fails.

At step d, the MSC 110 sends the result of authentication for the CCPD MS 202 back to the BS 602 in the ADDS Transfer Ack message. At step e, the PCF 602 recognizes that no A10 connection associated with the MS 202 is available and selects a PDSN 108 for the call. The PCF 602 sends an A11-Registration Request message to the selected PDSN 108 and starts timer Tregreq. At step f, the A11-Registration Request is validated and the PDSN 108 accepts the connection by returning an A11-Registration Reply message with an accept indication and the Lifetime field set to the configured $T_{rp}$ value. The PCF 602 stops timer Tregreq.

At step g, the MS 202 and the PDSN 108 exchange SDBs over common channels to establish the link layer (PPP) connection and then perform MIP registration procedures (if required). The first SDB sent from the BS 602 to the MS 202 serves as an acknowledgement to the MS's request for CCPD services. At step h, the MS 202 sends its data in a SDB over the common channel to the BS 602. At step i, the BS 602 acknowledges receipt of the SDB from the MS 202 by sending a BS Ack order to the MS 202. At step j, the PCF 602 sends the packet data to the PDSN 108. At step k, the PCF 602 sends an A11-Registration Request message with an SDB Airlink record to the PDSN 108. At step I, the PDSN 108 updates the accounting data and responds to the PCF 602 with an A11 Registration Reply.

A seventh aspect of the present invention provides a preferred embodiment of a process for CCPD MS inter-PCF Dormant handoff when the MS is served by the same PDSN. In order to obtain packet data services, a CCPD MS performed registration with the packet network. Both the A10 connection and the link layer (PPP) connection are maintained. The source PCF continues to perform re-registrations for the A10 connection with the PDSN by the exchange of A11-Registration Request and A11-Registration Reply messages before expiration of A10 connection Lifetime timer $T_{rp}$. While in the Dormant mode, the CCPD MS detects a change of PZID, SID or NID. Upon detection of a new PZID, SID or NID, the MS sends an Origination Message to the target BS 102 with a packet data service option and the SDB_DESIRED_ONLY bit set to 1. If the call is for a CCPD device, the FCH_SUPPORTED bit and DCCH_SUPPORTED bit are also set to 0. The Origination Message includes the previous PZID, SID and NID when any of these parameters change during the Dormant handoff. The target PCF establishes an A10 connection with the PDSN. Based on the IDs (PZID, NID and/or SID) in the Origination Message, the target PCF sends the PANID of the source PCF and the CANID of target PCF to the serving PDSN. The serving PDSN uses this information to determine whether Mobile IP registration is required. If the PDSN has data, the PDSN returns the 'Data Available Indicator' in the Vendor/Organization Specific Extension within the Registration Reply to the BS/PCF. The source PDSN releases the A10 connection with the source PCF.

The process described may also be used if the network decides to initiate CCPD Service for the Dormant mode handoff. In such a case, the MS sends an Origination message with the SDB_DESIRED_ONLY bit set to 0. The first SDB sent to the MS indicates that CCPD procedures will be used to support the Dormant mode handoff.

Figure 8:
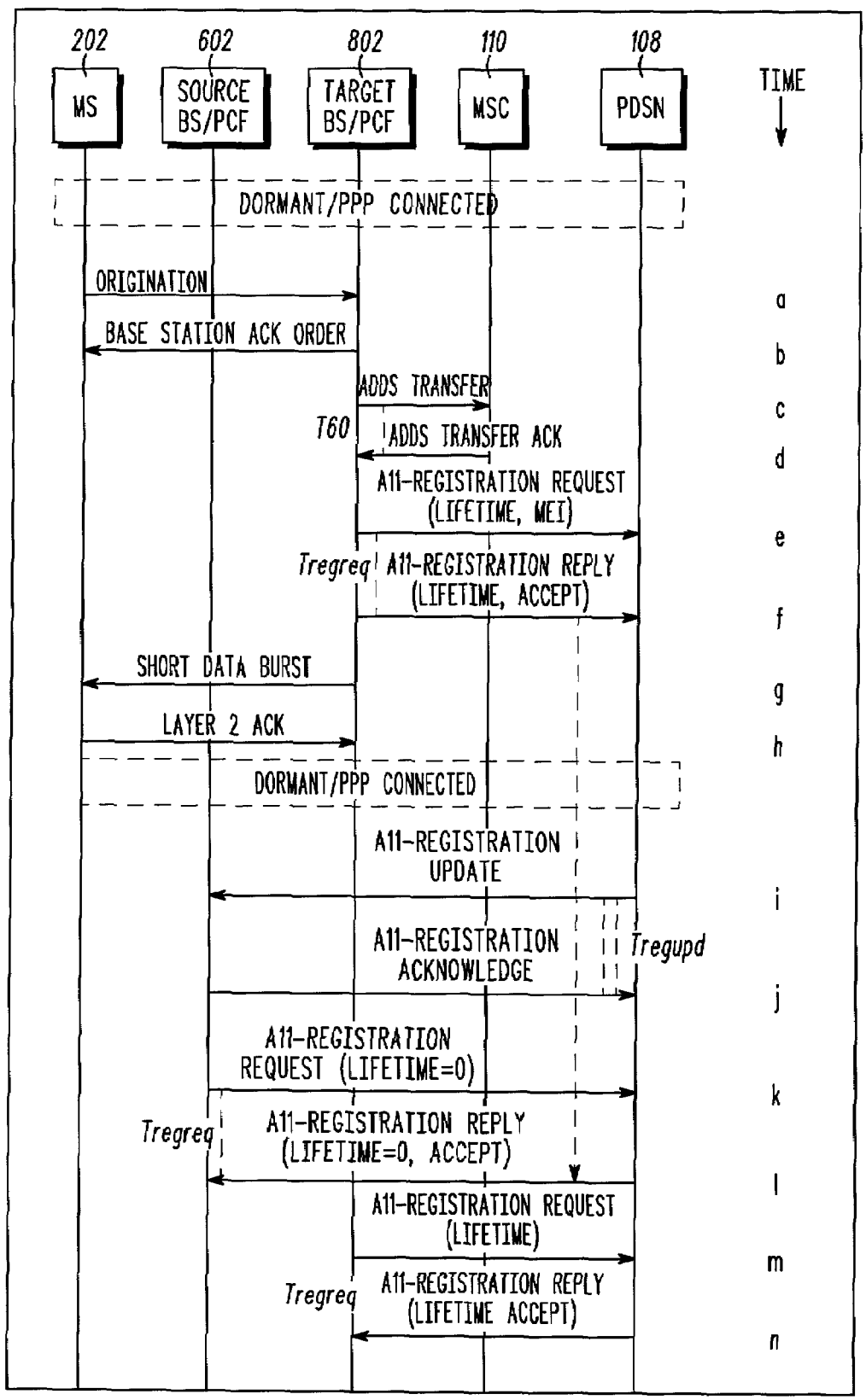
FIG. 8 is a block diagram of the preferred embodiment of a process for CCPD MS inter-PCF Dormant handoff when the MS is served by the same PDSN in accordance with the present invention.

Referring to FIG. 8, a flow diagram of the preferred embodiment of the process for CCPD MS inter-PCF Dormant handoff is shown. In this embodiment, the source BS and source PCF are configured as a single unit. The target BS and target PCF are also configured as a single unit. The process assumes that the CCPD MS 202 has previously performed PPP connection establishment and Mobile IP Registration with the PDSN 108 and is currently maintaining a Dormant packet data service instance. At step a, upon detection of a new Packet Zone ID, a CCPD MS 202 sends an Origination Message with the SDB_DESIRED_ONLY bit set to 1. At step b, the target BS 602 acknowledges receipt of the Origination Message with a BS Ack Order to the MS 202. At step c, the BS sends an ADDS Transfer message to the MSC 110. The message contains the authentication parameters received from the MS 202, the BS computed authentication data element, and the data burst type field of the ADDS User Part element set to SDB. If the BS determines that the CCPD MS 202 supports traffic channels, it may alternatively execute the MS Dormant mode handoff procedure described in section 2.15.5.8 of 3GPP2 A.S0001-A. The target BS 802 starts timer T60. At step d, the MSC 110 sends the ADDS Transfer Ack message to the target BS 802 with no cause value present. The target BS 802 cancels timer T60. If authentication of the MS 202 fails, the MSC 110 includes a cause value set to 'authentication failure' in the message and the CCPD call fails.

At step e, the target PCF 802 sends an A11-Registration Request message to the PDSN 108. The Registration Request message includes the Mobility Event Indicator within the Vendor/Organization Specific Extension. The PCF starts timer Tregreq. At step f, the A11-Registration Request is validated and the PDSN 108 accepts the connection by returning an A11 Registration Reply with an accept indication. If the PDSN 108 has data to send, it includes the Data Available Indicator within the Vendor/Organization Specific Extension. If the data is for a CCPD capable MS 202, a network initiated call re-origination may occur. The A10 connection binding information at the PDSN 108 is updated to point to the target PCF 802. The target PCF 802 stops timer Tregreq. At step g, the BS sends an empty SDB to the CCPD MS 202 to acknowledge acceptance of the CCPD service request. If the PDSN 108 sent data for the MS 202, the data is included in the SDB. At step h, the CCPD MS 202 responds with a layer 2 ack to acknowledge receipt of the SDB. The MS's packet data service instance resumes a Dormant state. If the network or MS 202 has any data to send, the data may be sent using SDBs over common channels using the CCPD procedures.

At step i, the PDSN 108 initiates closure of the A10 connection with the source PCF 602 by sending an A11-Registration Update message. The PDSN 108 starts timer Tregupd. At step j, the source PCF 602 responds with an A11-Registration Acknowledge message. The PDSN 108 stops timer Tregupd. At step k, the source PCF 602 sends an A11-Registration Request message to the PDSN 108 with Lifetime set to zero. The PCF starts timer Tregreq. At step l, the PDSN 108 sends the A11-Registration Reply message to the source PCF 602. The source PCF 602 closes the A10 connection for the MS 202. The source PCF 602 stops timer Tregreq. At step m, the target PCF 802 sends an A11-Registration Request message to the PDSN 108 before expiration of the registration Lifetime timer ($T_{rp}$) for refreshing registration of the A10 connection with the PDSN 108. The A11-Registration Request message is also used to send accounting related and other information to the PDSN 108. The accounting related and other information is sent at system defined trigger points. The PCF starts timer Tregreq.

At step n, for a validated A11-Registration Request, the PDSN 108 returns an A11-Registration Reply message with an accept indication and a configured Lifetime value. The PDSN 108 stores the accounting data (if received) for further processing, before returning the A11-Registration Reply. The PCF stops timer Tregreq.

An eighth aspect of the present invention provides a preferred embodiment of a process for CCPD MS inter-PCF Dormant handoff when the MS is served by a new PDSN. While the packet data session is in Dormant mode, the MS detects a change of PZID, SID or NID. Upon detection of a new, PZID, SID, or NID, the MS sends an Origination Message to the target BS that includes the packet data service option and the SDB_DESIRED_ONLY bit set to 0. If the call is for a CCPD device, the FCH_SUPPORTED bit and DCCH_SUPPORTED bit are also set to zero. The target PCF establishes an A10 connection with the target PDSN. The target PCF is required to forward the PANID of the source PCF and the CANID of the target PCF to the serving PDSN. PPP Connection Setup and Mobile IP Registration occur using SDBs over the common channels. The source PDSN releases the A10 connection with the source PCF upon expiration of the MIP registration timer. The target PCF periodically reregisters with the PDSN by the use of A11-Registration Request message before the A10 connection Lifetime expires.

The described process may also be used if the network decides to initiate CCPD service for the Dormant mode handoff. In such a case, the MS sends an Origination message with the SDB_DESIRED_ONLY bit set to 0. The first SDB sent to the MS indicates that CCPD procedures will be used to support the Dormant mode handoff.

Figure 9:
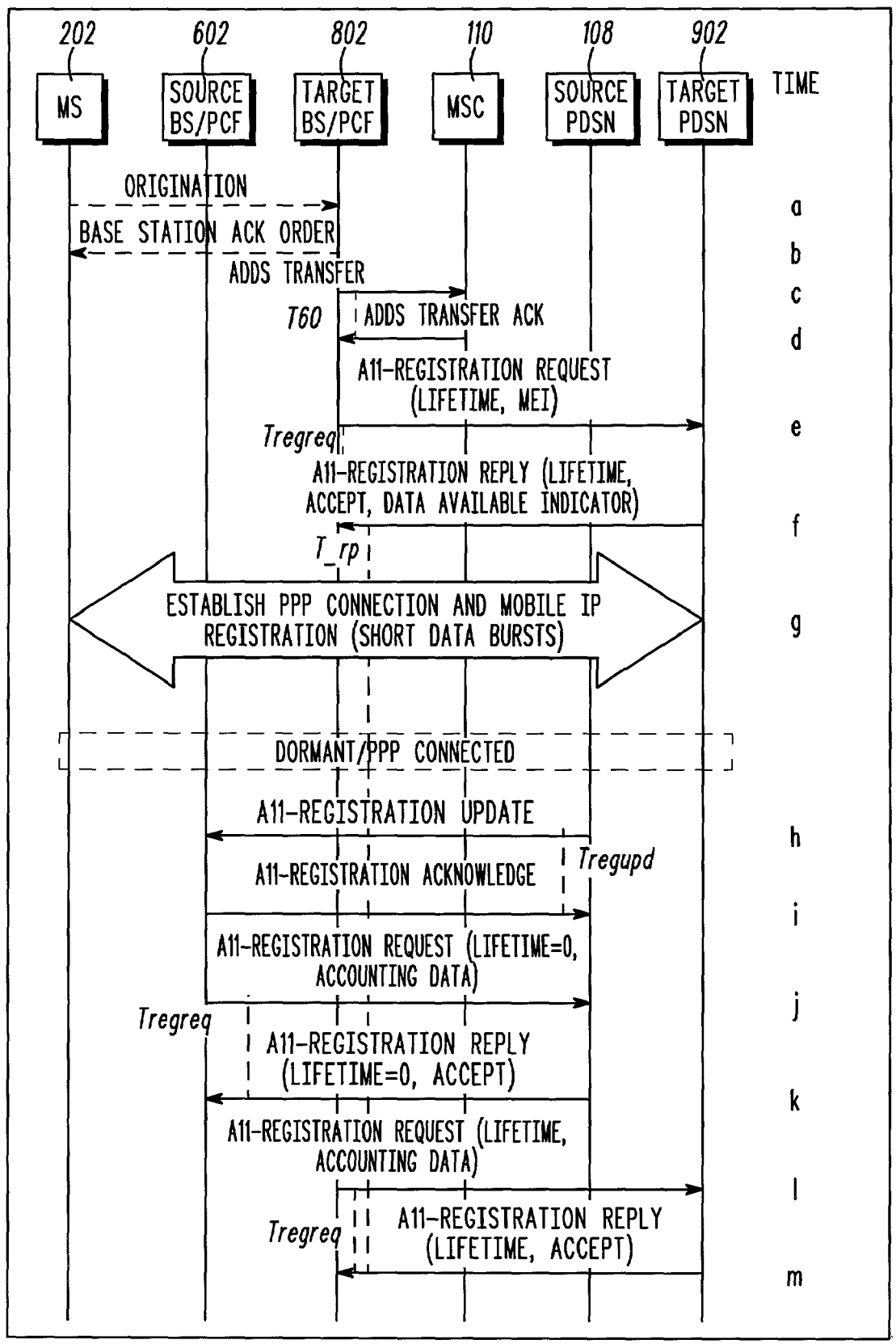
FIG. 9 is a block diagram of the preferred embodiment of a process for CCPD MS inter-PCF Dormant handoff when the MS is served by a new PDSN in accordance with the present invention.

Referring to FIG. 9, a flow diagram of the preferred embodiment of the process for CCPD MS inter-PCF Dormant handoff when the MS 202 is served by a new PDSN 902 is shown. In this embodiment, the source BS and source PCF are configured as a single unit. The target BS and target PCF are also configured as a single unit. The process assumes that the CCPD MS 202 has previously performed PPP connection establishment and Mobile IP Registration with the PDSN 904 and is currently maintaining a Dormant packet data service instance. At step a, upon detection of a new PZID, the CCPD MS 202 sends an Origination Message to the target BS 802 with the SDB_DESIRED_ONLY bit set to 1. At step b, the target BS 802 acknowledges the receipt of the Origination Message by sending a BS Ack Order to the MS 202. At step c, the BS 802 sends an ADDS Transfer message to the MSC 110. The message contains the authentication parameters received from the MS 202, the BS computed authentication data element, and the data burst type field of the ADDS User Part element set to SDB. If the target BS 802 determines that the CCPD MS 202 supports traffic channels, the target BS 802 may alternatively execute the MS Dormant mode handoff procedure as described in section 2.15.5.9 of 3GPP2 A.S0001-A. The target BS 802 starts timer T60.

At step d, the MSC 110 sends the ADDS Transfer Ack message to the target BS 802 with no cause value present. The target BS 802 cancels timer T60. If authentication of the MS 202 fails, the MSC 110 includes a cause value set to 'authentication failure' in the message. At step e, the target PCF 802 initiates establishment of the A10 connection by sending an A11 Registration Request message to the target PDSN 902. The Registration Request message includes the Mobility Event Indicator within the Vendor/Organization Specific Extension. The PCF 802 starts timer Tregreq. At step f, the A11-Registration Request is validated and the target PDSN 902 accepts the connection by returning an A11-Registration Reply with an accept indication and Data Available Indicator within the Vendor/Organization Specific Extension. The PCF 802 stops timer Tregreq.

At step g, the MS 202 and the target PDSN 902 exchange SDBs over common channels to establish the link layer (PPP) connection and then perform MIP registration procedures over the link layer (PPP) connection. The first SDB sent from the BS 802 to the MS 202 serves as an acknowledgement to the MS's request for CCPD services. The MS's packet data service instance resumes a Dormant state. If the network or MS 202 has any data to send, the data is sent using SDBs over common channels using the CCPD procedures.

At step h, upon expiration of the MIP registration timer, the source PDSN 108 initiates closure of the A10 connection with the source PCF 602 by sending an A11-Registration Update message. The source PDSN 108 starts timer Tregupd. At step i, the source PCF 602 responds with an A11 Registration Acknowledge message. The source PDSN 108 stops timer Tregupd. At step j, the source PCF 602 sends an A11-Registration Request message to the source PDSN 108 with accounting related information and with Lifetime set to zero. The source PCF 602 starts timer Tregreq. At step k, the source PDSN 108 stores the accounting related information for further processing before returning A11-Registration Reply message. The source PCF 602 closes the A10 connection for the MS 202. The source PCF 602 stops timer Tregreq. At step I, the target PCF 802 sends A11-Registration Request message before expiration of registration Lifetime timer ($T_{rp}$) for refreshing registration for the A10 connection with the target PDSN 902. A11-Registration Request message is also used to send accounting related and other information to the target PDSN 902. The accounting related and other information is sent at system defined trigger points. The target PCF 802 starts timer Tregreq. At step m, for a validated A11-Registration Request, the target PDSN 902 returns an A11-Registration Reply message with an accept indication and a configured Lifetime value. The target PDSN 902 stores the accounting related and other information (if received) for further processing, before returning the A11-Registration Reply. The target PCF 802 stops timer Tregreq.

As previously described, the embodiments of the present invention for supporting common channel packet data (CCPD) services in a cdma2000 RAN provide a means of transmitting data between the network and a MS without the use of a traffic channel. Packet data sessions may be initiated, Dormant mode handoffs performed, and packet data may be exchanged all without the use of traffic channels. Furthermore, an A8 connection between the PCF and PDSN is not required to support packet data service once the MS has successfully registered in the network.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. In a base system, a method of performing packet data call setup comprising the steps of:
receiving an origination message wherein the origination message comprises a request for common channel packet data service;
acknowledging receipt of the origination message;
determining whether to grant the request for common channel packet data service;
when the request is granted,
sending an ADDS transfer message to a mobile station controller, the ADDS transfer message comprising authentication parameters received from a mobile station, a base system computed authentication data element and an ADDS User Part element with a data burst type field set to short data burst;
receiving authentication results from the mobile station controller; and
facilitating a PPP connection between the mobile station and a packet data serving node.

2. The method of claim 1 wherein the step of facilitating a PPP connection comprises the steps of:
sending at least one message received in short data burst format from the packet control function to the mobile station in at least one short data burst over a common channel; and
sending at least one message received in at least one short data burst from the mobile station to the packet control function in short data burst format over an A9 signaling channel.

3. The method of claim 2 wherein all or part of a first of the at least one message sent to the mobile station serves as an acknowledgment to the mobile station's request for common channel packet data service.

4. The method of claim 1 wherein the origination message is received from a common channel packet data device and wherein when the request is not granted, the call setup fails.

5. The method of claim 1 wherein the origination message is received from a common channel packet data capable mobile station and wherein when the request is not granted, the method comprises the steps of:
determining whether a traffic channel is available; and when a traffic channel is available, assigning the traffic channel to the common channel packet data capable mobile station.

6. The method of claim 1 wherein before the step of facilitating a PPP connection, the method comprises the step of sending a message to a packet control function to request an A10 connection setup, the message indicating that an A8 connection is not required and whether the call setup is for a common channel packet data device.

7. The method of claim 1 wherein when the request is granted, the method further comprises the step of performing mobile internet protocol registration procedures by sending at least one message received in short data burst format from the packet control function to the mobile station in at least one short data burst over a common channel; and sending at least one message received in at least one short data burst from the mobile station to the packet control function in short data burst format over an A9 signaling channel.

8. The method of claim 1 wherein after the step of facilitating a PPP connection, the method further comprises the step of transitioning a packet data session from a RAN packet data null state to a RAN packet data Dormant state.

9. The method of claim 8 further comprising the steps of:
receiving packet data from the mobile station in a short data burst over the common channel; and
acknowledging receipt of the packet data.

10. The method of claim 9 further comprising the step of sending the packet data to the packet control function.

11. In a base system, a method of performing Dormant mode handoff of a mobile station comprising the steps of:
receiving an origination message from the mobile station, wherein the origination message comprises a request for a dormant mode handoff with common channel packet data service;
acknowledging receipt of the origination message;
determining whether to grant the request;
when the request is granted,
sending an ADDS transfer message to a mobile station controller, the ADDS transfer message comprising authentication parameters received from the mobile station, a base system computed authentication data element and an ADDS User Part element with a data burst type field set to short data burst; and
receiving authentication results from the mobile station controller;
sending a message to a packet control function, the message having data ready indicator and handoff indicator bits set to zero, the message indicating that an A8 connection is not required; and
receiving a response message from the packet control function.

12. The method of claim 11 wherein when the request is not granted, the method comprises the steps of:
when the mobile station is a common channel packet data device, failing dormant mode handoff; and
when the mobile station is not a common channel packet data device and a traffic channel is available, requesting the traffic channel for the mobile station for the transmission and reception of data.

13. The method of claim 11 wherein when the request is granted, the method further comprises the steps of:
receiving data from the packet control function for the mobile station;
sending the data to the mobile station in a short data burst; and
receiving an acknowledgement of receipt of the short data burst.

14. The method of claim 11 wherein when the request is granted, the method further comprises the steps of:
sending an empty short data burst to the mobile station as acknowledgement to the mobile station's request for common channel packet data service; and
receiving an acknowledgement of receipt of the short data burst.

15. The method of claim 11 wherein when the request is granted, the method further comprises the step of facilitating a PPP connection between the mobile station and a packet data serving node.

16. The method of claim 15 wherein the step of facilitating a PPP connection comprises the steps of:
sending at least one message received in short data burst format from the packet control function to the mobile station in at least one short data burst over a common channel; and
sending at least one message received in at least one short data burst from the mobile station to the packet control function in short data burst format over an A9 signaling channel.

17. The method of claim 11 wherein when the request is not granted, the method comprises the steps of:
when the mobile station is a common channel packet data device, failing dormant mode handoff; and
when the mobile station is a common channel packet data capable mobile station and a traffic channel is available, assigning the traffic channel to the mobile station for the transmission and reception of messages.

18. The method of claim 16 wherein after the step of facilitating a PPP connection, the method further comprises the steps of:
receiving data from the packet control function for the mobile station;
sending the data to the mobile station in a short data burst; and
receiving an acknowledgement of receipt of the data.

19. The method of claim 16 wherein all or part of a first of the at least one message sent to the mobile station serves as an acknowledgment to the mobile station's request for common channel packet data service.

20. The method of claim 16 further comprising the step of performing mobile internet protocol registration procedures by sending at least one message received in short data burst format from the packet control function to the mobile station in at least one short data burst over a common channel; and sending at least one message received in at least one short data burst from the mobile station to the packet control function in short data burst format over an A9 signaling channel.

21. In a base system, a method of performing dormant mode handoff comprising the steps of:
receiving an origination message, wherein the origination message comprises a request for a dormant mode handoff;
acknowledging receipt of the origination message;
determining whether to initiate common channel packet data service;
when a determination is made to initiate common channel packet data service,
sending an ADDS transfer message to a mobile station controller, the ADDS transfer message comprising authentication parameters received from a mobile station, a base system computed authentication data element and an ADDS User Part element with a data burst type field set to short data burst;

receiving authentication results from the mobile station controller;

sending a message to a packet control function, the message having data ready indicator and handoff indicator bits set to zero, the message indicating that an A8 connection is not required; and receiving a response message from the packet control function.

22. The method of claim 21 wherein when a determination is made to initiate common channel packet data service, the method further comprises the steps of:

receiving data from the packet control function for the mobile station;

sending the data to the mobile station in a short data burst; and receiving an acknowledgement of receipt of the data.

23. The method of claim 21 wherein when a determination is made to initiate common channel packet data service, the method further comprises the steps of:

sending an empty short data burst to the mobile station as an indication that common channel packet data service shall be used to support the dormant mode handoff; and receiving an acknowledgement of receipt of the short data burst.

24. The method of claim 21 wherein when the request is granted, the method further comprises the step of facilitating a PPP connection between the mobile station and a packet data serving node.

25. The method of claim 24 wherein the step of facilitating a PPP connection comprises the steps of:

sending at least one message received in short data burst format from the packet control function to the mobile station in at least one short data burst over a common channel; and sending at least one message received in at least one short data burst from the mobile station to the packet control function in short data burst format over an A9 signaling channel.

26. The method of claim 25 wherein when a determination is made to initiate common channel packet data service, the method further comprises the steps of:

receiving data from the packet control function for the mobile station;

sending the data to the mobile station in a short data burst; and receiving an acknowledgement of receipt of the data.

27. The method of claim 25 wherein all or part of a first of the at least one message sent to the mobile station serves as an acknowledgment to the mobile station's request for common channel packet data service.

28. The method of claim 25 further comprising the step of performing mobile internet protocol registration procedures by sending at least one message received in short data burst format from the packet control function to the mobile station in at least one short data burst over a common channel; and sending at least one message received in at least one short data burst from the mobile station to the packet control function in short data burst format over an A9 signaling channel.

29. In a mobile station, a method of performing packet data call setup for transmission and reception of data over a common channel comprising the steps of:

transmitting an origination message to a base system, wherein the origination message comprises a request for common channel packet data service;

receiving an acknowledgement that the Origination Message was received; and establishing a PPP connection by sending data in at least one short data burst to the base system over the common channel and receiving data from the base system in at least one short data burst over the common channel.

30. The method of claim 29 wherein when the mobile station is a CCPD device, the step of transmitting an origination message comprises indicating that the mobile station does not support traffic channels.

31. The method of claim 29 wherein when the mobile station is a CCPD capable mobile station, the step of transmitting an origination message comprises indicating that the mobile station supports traffic channels.

32. The method of claim 29 further comprising the step of performing mobile internet protocol registration procedures by sending data in at least one short data burst to the base system over the common channel and receiving data from the base system in at least one short data burst over the common channel.

33. The method of claim 29 wherein a first of the at least one short data bursts received from the base system serves as confirmation for the request for common channel packet data service.

34. The method of claim 29 further comprising the steps of:

transitioning from an idle state to a Dormant state;

sending data to the base system in a short data burst over the common channel; and receiving an acknowledgment from the base system.

35. In a base system, a method of performing packet data call setup comprising the steps of:

receiving an origination message;

acknowledging receipt of the origination message;

determining whether to initiate common channel packet data service;

when a determination is made to initiate common channel packet data service, sending an ADDS transfer message to a mobile station controller, the ADDS transfer message comprising authentication parameters received from a mobile station, a base system computed authentication data element and an ADDS User Part element with a data burst type field set to short data burst;

receiving authentication results from the mobile station controller; and facilitating a PPP connection between the mobile station and a packet data serving node.

36. The method of claim 35 wherein the step of facilitating a PPP connection comprises the steps of:

sending at least one message received in short data burst format from the packet control function to the mobile station in at least one short data burst over a common channel; and sending at least one message received in at least one short data burst from the mobile station to the packet control function in short data burst format over an A9 signaling channel.

37. The method of claim 36 wherein all or part of a first of the at least one message sent to the mobile station serves as an acknowledgment that common channel packet data service shall be used to support the call setup.

* * * * *